(12) United States Patent
Stickelmaier et al.

(10) Patent No.: US 9,181,934 B2
(45) Date of Patent: Nov. 10, 2015

(54) ROTARY SWITCH ASSEMBLY FOR ION PROPULSION SYSTEM

(71) Applicant: The Boeing Company, Chicago, IL (US)

(72) Inventors: John F. Stickelmaier, Manhattan Beach, CA (US); John Ziavras, Hermosa Beach, CA (US); Julie Marie Perkins, Hawthorne, CA (US); Kurt B. Kreiner, Rancho Palos Verdes, CA (US); Glenn N. Caplin, Manhattan Beach, CA (US); Brian K. Smith, Redondo Beach, CA (US); Peter S. Lauenstein, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 635 days.

(21) Appl. No.: 13/683,688

(22) Filed: Nov. 21, 2012

(65) Prior Publication Data
US 2014/0137537 A1    May 22, 2014

(51) Int. Cl.
*B64G 1/42* (2006.01)
*F03H 1/00* (2006.01)
*H01H 19/50* (2006.01)
*H01H 19/64* (2006.01)

(52) U.S. Cl.
CPC .............. *F03H 1/0043* (2013.01); *B64G 1/428* (2013.01); *F03H 1/0018* (2013.01); *H01H 19/50* (2013.01); *H01H 19/64* (2013.01); *B64G 1/42* (2013.01)

(58) Field of Classification Search
CPC ........ B64G 1/42; B64G 1/428; F03H 1/0018; F03H 1/0043; H01H 19/50; H01H 19/64
See application file for complete search history.

(56) References Cited

U.S. PATENT DOCUMENTS

| 3,093,713 | A * | 6/1963 | Eadie .............................. 200/14 |
| 3,480,745 | A * | 11/1969 | Sitz ................................. 200/14 |
| 6,481,302 | B2 | 11/2002 | Ziavras |
| 6,948,305 | B2 | 9/2005 | Beattie et al. |
| 2014/0065950 | A1 * | 3/2014 | Mendelsohn et al. ....... 455/12.1 |
| 2014/0208713 | A1 * | 7/2014 | Lorand ........................... 60/202 |

\* cited by examiner

*Primary Examiner* — Phutthiwat Wongwian
*Assistant Examiner* — William Breazeal
(74) *Attorney, Agent, or Firm* — Ostrager Chong Flaherty & Broitman P.C.

(57) ABSTRACT

A gridded ion propulsion system comprising two power controllers, four ion thrusters, and two switch assemblies. One switch assembly is connected to the two power controllers and to two of the four ion thrusters. The other switch assembly is connected to the two power controllers and to the other two ion thrusters. Each switch assembly has first and second switching states which can be selected to enable either power controller to supply power to any one of the four ion thrusters. Each switch assembly comprises a respective movable body and a respective multiplicity of switches which change state in unison when the movable body changes position. For example, the movable body may be a rotatable hollow shaft driven by a stepper motor.

22 Claims, 13 Drawing Sheets

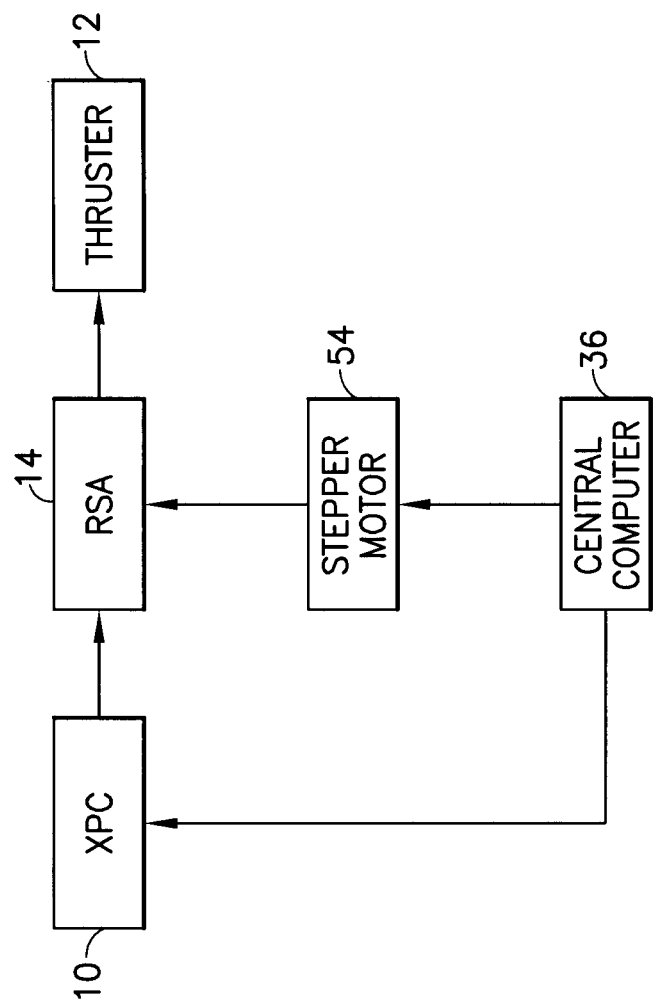

ROTARY SWITCH ASSEMBLY FOR ION PROPULSION SYSTEM

BACKGROUND

This disclosure generally relates to apparatus and methods for optimizing the operation of ion thruster arrays.

Ion propulsion generally involves employing an ionized gas accelerated electrically across charged grids to develop thrust. The electrically accelerated particles can achieve very high speeds. The gas used is typically a noble gas, such as xenon. The principal advantage afforded by ion propulsion systems over conventional chemical propulsion systems is their very high efficiency. For example, with the same amount of fuel mass, an ion propulsion system can achieve a final velocity as much as ten times higher than that obtainable with a chemical propulsion system. Although they are efficient, ion propulsion systems develop very low thrust when compared with chemical propulsion systems. This reality has narrowed the range of ion propulsion applications. However, ion propulsion is well suited for space applications where low thrust is often acceptable and fuel efficiency is critical. Many spacecraft, including satellites as well as exploration vehicles, use ion propulsion systems.

For example, spacecraft such as communications satellites now commonly utilize ion propulsion for station keeping and other functions. Ion thrusters utilize electrical power generated by the solar cells of the satellite to supply energy to a propellant to generate the propulsion. In a typical satellite ion thruster, thrust is created by accelerating positive ions through a series of gridded electrodes at one end of a thrust chamber. The electrodes, known as an ion extraction assembly, create thousands of tiny beams of thrust. The beams are prevented from being electrically attracted back to the thruster by an external electron-emitting neutralizer. The power controller is the device which serves to provide electrical control and power to drive the ion thruster, including control of the emission currents in the discharge and neutralizer cathodes.

It is known to use an Xenon Ion Propulsion System (XIPS) to provide thrust for station keeping and transfer orbit of satellites. XIPS uses electricity from the Sun and a working gas to provide propulsion through acceleration of charged ions. A heritage satellite used four ion thrusters (two pairs) and had four separate power processing units (PPUs) so that all four thrusters would be capable of being turned on simultaneously. Consequently, this added considerably to the mass required to drive the ion thruster array.

U.S. Pat. No. 6,948,305 disclosed an XIPS comprising a power processing system having reduced mass. That power processing system allowed a single PPU to power a plurality of ion thrusters in an array with the voltage-regulated supplies common to certain elements of the ion thrusters. (The current-regulated supplies have individual outputs so as to provide desired controlled currents to the anodes, keepers and heaters.) The advantage of this approach is mass savings in the voltage-regulated supplies and a significant reduction in the overall packaging mass.

It is further known to equip a satellite with two redundant subsystems, each subsystem comprising one PPU wired to two ion thrusters. The two subsystems are completely independent, but both subsystems can be rendered inoperative if, for example, one subsystem has a thruster problem and the other subsystem has a PPU problem. To address this problem, an XIPS Relay Unit (XRU) was added between the ion thrusters and the PPU. This XRU allowed the ion thrusters and the PPU of the other redundant subsystem to be used. As a result, either PPU could fire any one of four ion thrusters. The addition of the XRU allowed for multiple failures in the PPU and thrusters, while maintaining a working subsystem. All that was required to maintain spacecraft control was thrust from one thruster. Each XRU consisted of a relay bank operated by a relay driver circuit. The ion thrusters and PPU were wired to give maximum redundancy.

A known XRU design utilized up to 36 relays to perform the switching function. That XRU was large in size and the 36 switching elements had to all work together to switch the individual 18 circuits. The ability to isolate either pair of thrusters was not available in the XRU using relays.

There is a need for a more reliable switching function that is significantly lighter, has a smaller envelope, and costs less than the XRU and allows either pair of thrusters to be isolated.

SUMMARY

A gridded ion propulsion system is disclosed having two XIPS power controllers (XPCs), two rotary switch assemblies (RSAs), and four ion thrusters. Each of the four ion thrusters can be fired by either XPC by properly configuring the RSAs and XPCs. Another way to state this is that the system will allow any thruster to be fired by either XPC. This will be done on station when only one thruster is fired at a time. However, if proper satellite operation requires that two thrusters be fired at the same time, the disclosed system allows either of the two XPCs to fire any two of the four ion thrusters by using a single movable body, e.g., a rotatable hollow shaft (i.e., drum). The system can select which two thrusters to fire and then decide which XPC will fire which thruster by properly configuring the RSAs and XPCs. One XPC can only operate one thruster at a time. So whenever two thrusters are to be fired at the same time, both XPCs must utilized.

In accordance with one embodiment, the foregoing switching functionality is fulfilled by a system that employs rotary switches (or other types of switches as described hereinafter) rather than relays to select which ion thruster is fired by which XPC. The utilization of special high-voltage, high-reliability rotary switches between the XPCs and the ion thrusters allows either of the two XPCs on the satellite to fire any of the four thrusters. In accordance with various embodiments, each rotary switch utilizes one common switching element, i.e., a single rotor, to switch all 18 circuits. Either they all switch or they all do not switch, making for a more reliable switching function. In addition, each rotary switch can have a compact design by using proven high-reliability rotor and brush assemblies. In addition, the rotary switch concept allows the thrusters to be isolated for added operational flexibility. The presence of a pair of RSAs allows for multiple failures in both the XPCs and ion thrusters. All that is required to maintain spacecraft control is thrust from one ion thruster.

In accordance with one embodiment, each RSA has 18 contact rings and three brushes per contact ring. In accordance with an alternative embodiment, the RSA has four brushes per contact ring, thereby reducing the number of contact rings needed to nine. The reduced ring count in the alternative embodiment allows the size and mass of the RSA to be reduced. In both rotary switch embodiments, each RSA comprises a rotary electrical contact ring assembly with segmented slip rings and circumferential brushes that make and break electrical connections at the same time for both XPCs and both thrusters connected to the RSA. All rings of an RSA are rotated at the same time so that mixed states of connectivity are not possible. The rotors of the RSAs are driven by stepper motors with redundant windings. The RSAs are designed for high-voltage operation in either vacuum or an on-ground test environment.

Although the embodiments described in detail below employ rotary switches, other types of switches that switch in unison can be used to switch the individual circuits that connect the power supplies to a pair of ion propulsion thrusters. Such alternative switching systems may comprise leaf-spring type contacts that are opened/closed by means of rotary contact arms or linearly movable contact plates wherein pairs of springs are contacted to form a multi-pole switch. Other leaf spring design concepts include rotary rocker arms and linear jackscrews. While the latter alternative switching systems avoid procurement of sintered brushes and molded shaft assemblies, they have a larger envelope, greater weight and higher torques.

One aspect of the subject matter disclosed herein is an ion propulsion system comprising first and second power controllers, first and second ion thrusters and a switch assembly having at least first and second switching states, wherein when the first and second power controllers are on, the first and second ion thrusters receive power from the first and second power controllers respectively via the first switch assembly when the first switch assembly is in the first switching state and receive power from the second and first power controllers respectively via the switch assembly when the first switch assembly is in the second switching state. The switch assembly comprises a body which is moveable and a multiplicity of switches which change state in unison when the body changes position. The switch assembly is in the first switching state when the body is in a first position and is in the second switching state when the body is in a second position. In addition, the first and second ion thrusters are electrically isolated from the first and second power controllers by the switch assembly when the body is in a third position. In one embodiment, the body comprises a center shaft, and the switch assembly further comprises a plurality of contact disks attached to the center shaft and a multiplicity of brushes, a respective set of three or four brushes being in contact with a respective exterior surface of each contact disk, each exterior surface comprising a conductive contact segment and a nonconductive segment.

In accordance with one embodiment, the body comprises a center shaft that is rotatable and the first and second positions are first and second angular positions respectively of the center shaft. A stepper motor is operatively coupled to the center shaft for changing its angular position. The switch assembly further comprises a plurality of contact disks attached to the center shaft and a multiplicity of brushes.

The system further comprises a computer system which is programmed to send a pulse train that steps the stepper motor and provide the power needed by the stepper motor to perform the stepping function. The computer system is further programmed to selectively turn the power supplies provided by the first or second power controller on and off for the purpose of keeping the operation of the first or second ion thruster stable.

In accordance with another aspect, an ion propulsion system is provided which comprises first and second power controllers, first through fourth ion thrusters, and first and second switch assemblies, the first switch assembly being connected to the first and second power controllers and to the first and second ion thrusters, and the second switch assembly being connected to the first and second power controllers and to the third and fourth ion thrusters. Each of the first and second switch assemblies has first and second switching states which can be selected to enable either of the first and second power controllers to supply power to any one of the first through fourth ion thrusters. The first switch assembly comprises a first body which is movable and a first multiplicity of switches which change state in unison when the first body changes position, and the second switch assembly comprises a second body which is moveable and a second multiplicity of switches which change state in unison when the second body changes position.

Yet another aspect is a method for providing power from a selected one of first and second power controllers to a selected one of first and second ion thrusters onboard a satellite, comprising: (a) electrically connecting the first and second ion thrusters and the first and second power controllers to a switch assembly that comprises a body which is moveable and a multiplicity of switches which change state in unison when the body changes position from a first position whereat the selected one of the first and second ion thrusters is not connected to the selected one of the first and second power controllers to a second position whereat the selected one of the first and second ion thrusters is connected to the selected one of the first and second power controllers by way of the switches; (b) causing the body to change its position from the first position to the second position; and (c) turning on the selected one of the first and second power controllers while the body is in the second position. In accordance with some embodiments, the body comprises a center shaft that is rotatable and the first and second positions are first and second angular positions respectively of the center shaft.

A further aspect is a method for providing power from a selected power controller to a selected ion thruster onboard a satellite, comprising: (a) rotating an assembly comprising a plurality of contact disks from a first angular position to a second angular position while the selected power controller is turned off; and (b) turning on the selected power controller while the shaft assembly is in the second angular position.

Other aspects are disclosed and claimed below.

BRIEF DESCRIPTION OF THE DRAWINGS

FIG. 10 shows the rotary switch assembly in a cross strapped configuration; FIG. 11 shows the rotary switch assemblies in a normal configuration.

FIG. 13 is a block diagram showing basic components of an XIPS in accordance with the embodiments disclosed hereinafter.

Reference will hereinafter be made to the drawings in which similar elements in different drawings bear the same reference numerals.

DETAILED DESCRIPTION

The basic structure and operation of an ion thruster for use on satellites are well known and will only be briefly described here. Each ion thruster includes an ion extraction assembly, a housing which forms an ionization chamber, a discharge electron source and an electrode system which are positioned within the chamber, a magnetic field generator which is also positioned within the chamber, and a neutralizer positioned adjacent the ion extraction assembly. The ion thruster is coupled to a vessel which contains an ionizable gas (e.g., xenon) and a power supply system.

In a basic operation of an ion thruster, the ionizable gas of the vessel is supplied to the chamber via a valve and primary electrons are injected into the gas from the electron source. A discharge voltage applied to the electrode system accelerates these electrons into collisions with gas atoms to generate a plasma. The magnetic field generator typically includes annular permanent magnets and is configured to develop magnetic flux lines proximate to the housing. These flux lines direct electrons along extended paths and thus enhance the generation of the plasma. In accordance with one embodiment, the ion extraction assembly has a screen grid, an accelerator grid and a decelerator grid (the decelerator grid is optional). Electrical power from the power supply system is applied to the grids to cause the ion extraction assembly to extract an ion beam from the plasma and accelerate it away from the thruster. The ion beam generates a force upon the ion thruster and spacecraft to which it is attached.

If not otherwise compensated, the positive charge flow of the ion beam would develop a negative charge on the ion thruster that would degrade the thruster's force. Accordingly, the neutralizer injects an electron stream into the proximity of the ion beam to offset its charge-depleting effects. The electron stream also partially neutralizes the positive space charge of the ion beam to prevent excessive beam divergence.

Figure 1:
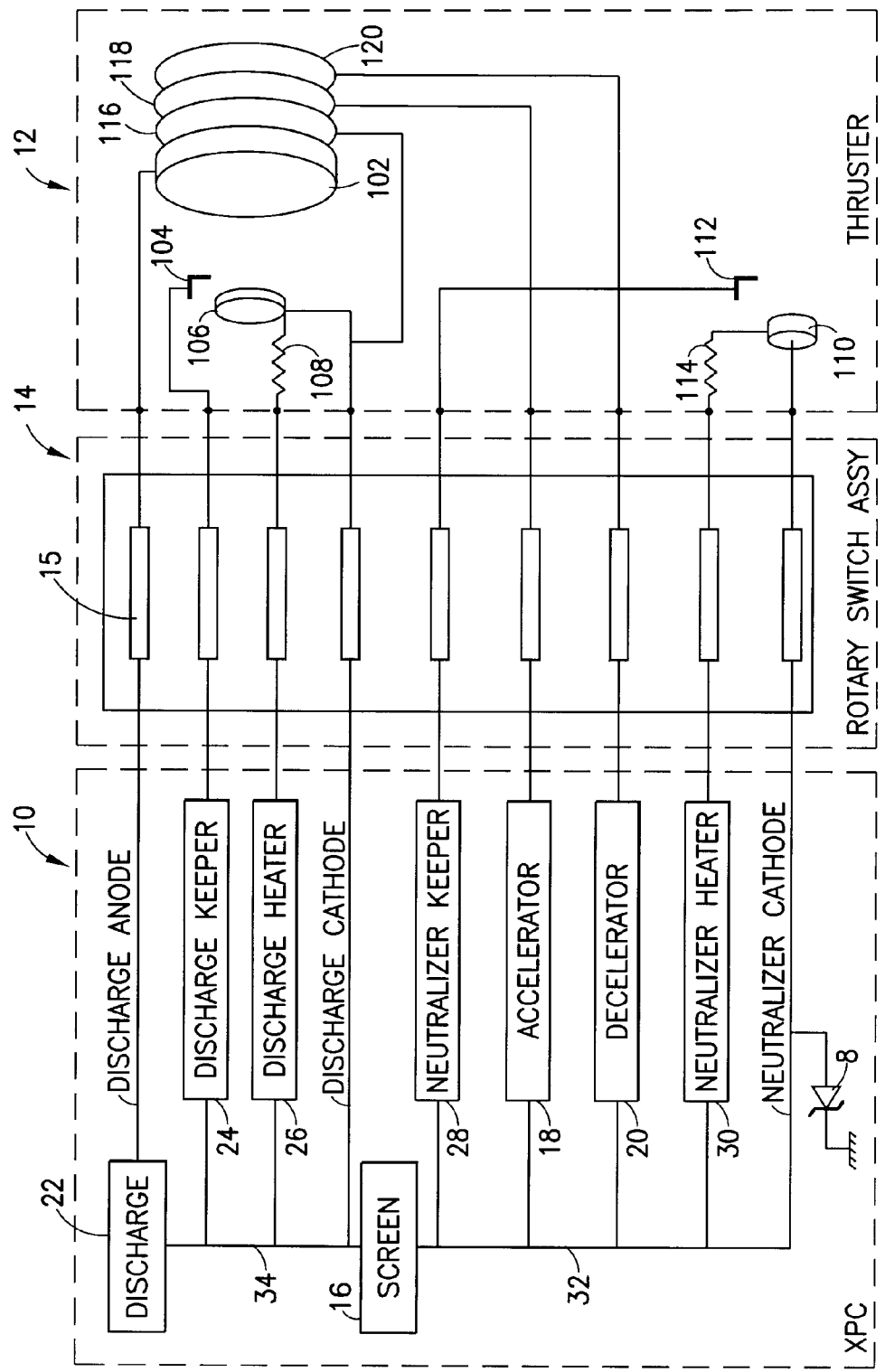
FIG. 1 is a block diagram showing the connection of one XPC to one thruster by means of a rotary switch assembly (RSA).

FIG. 1 shows components of an XIPS that incorporates ion thrusters of the type described above. More specifically, FIG. 1 shows a rotary switch assembly (RSA) 14 installed between an XIPS Power Controller (XPC) 10 and a thruster 12. The thruster 12 comprises a discharge anode 102, a discharge cathode 106, a discharge keeper electrode 104, a discharge heater 108, a neutralizer cathode 110, a neutralizer keeper electrode 112, a neutralizer heater 114, a screen grid 116, an accelerator grid 118 and a decelerator grid 120.

FIG. 1 shows the nine different circuits required to operate the thruster 12, each circuit including a respective electrical connection 15 inside the RSA 14. Although each RSA in a preferred embodiment has inputs for two XPCs and outputs for two thrusters, FIG. 1 shows only the connections from one XPC to one thruster. The electrical connections 15 are made when a shaft assembly of a rotary switch assembly (RSA) 14 is rotated to a predefined angular position (as will be described in more detail later with reference to FIG. 8A-8C).

XPC 10 comprises a screen power supply 16, an accelerator power supply 18 and a decelerator power supply 20, each of which is a voltage-regulated power supply. XPC 10 further comprises a discharge power supply 22, discharge keeper and heater power supplies 24, 26, and neutralizer keeper and heater power supplies 28, 30, all of which are current-regulated power supplies.

The discharge electron source of thruster 12 comprises discharge cathode 106, discharge keeper electrode 104 and discharge heater 108 which, when proper electrical connections have been made, receives current from the discharge heater power supply 26 of the XPC 10. The discharge keeper supply 24 of XPC 10 places a positive voltage on the thruster keeper electrode 104 to initiate a plasma discharge and provide electrons to the ionization chamber. The electrode system of the thruster further includes discharge anode 102. A discharge voltage is placed across the electron source and the discharge anode 102 of thruster 12 by discharge supply 22 of the XPC 10 to accelerate the primary electrons through the ionizable gas. The accelerator power supply 18 accelerates ions out of the thruster. The thruster neutralizer includes neutralizer cathode 110, neutralizer keeper electrode 112 and neutralizer heater 114, which are substantially the same as the discharge cathode 106, discharge keeper electrode 104 and discharge heater 108 that are positioned in the ionization chamber. A neutralizer heater power supply 30 of XPC 10 is coupled across the neutralizer heater 114 to generate an electron supply and a neutralizer keeper power supply 28 of XPC 10 places a positive voltage on the neutralizer keeper electrode 112 to initiate a plasma which is the source of the electron stream.

Still referring to FIG. 1, the XPC 10 comprises a lower supply bus 32 and an upper supply bus 34. The lower supply bus 32 is referenced to a spacecraft "ground" and the potentials of these supply buses are electrically separated by the voltage differential of the screen power supply 16. The lower supply bus 32 references neutralizer keeper power supply 28, neutralizer heater power supply 30, accelerator power supply 18 and decelerator power supply 20. A Zener diode 8 connected to the lower supply bus 32 allows the lower supply bus to float negative with respect to the spacecraft potential to realize a potential which causes the electron stream to equalize the ion beam. The upper supply bus 34 references discharge power supply 22, discharge keeper power supply 24, discharge heater power supply 26 and screen grid 116 to the discharge electron source. The discharge power supply 22 is coupled to the discharge anode 102 to provide ionizing power to the fuel (e.g., xenon) and the screen power supply 16 is coupled to the discharge cathode 106 to drive the main beam.

Figure 2:
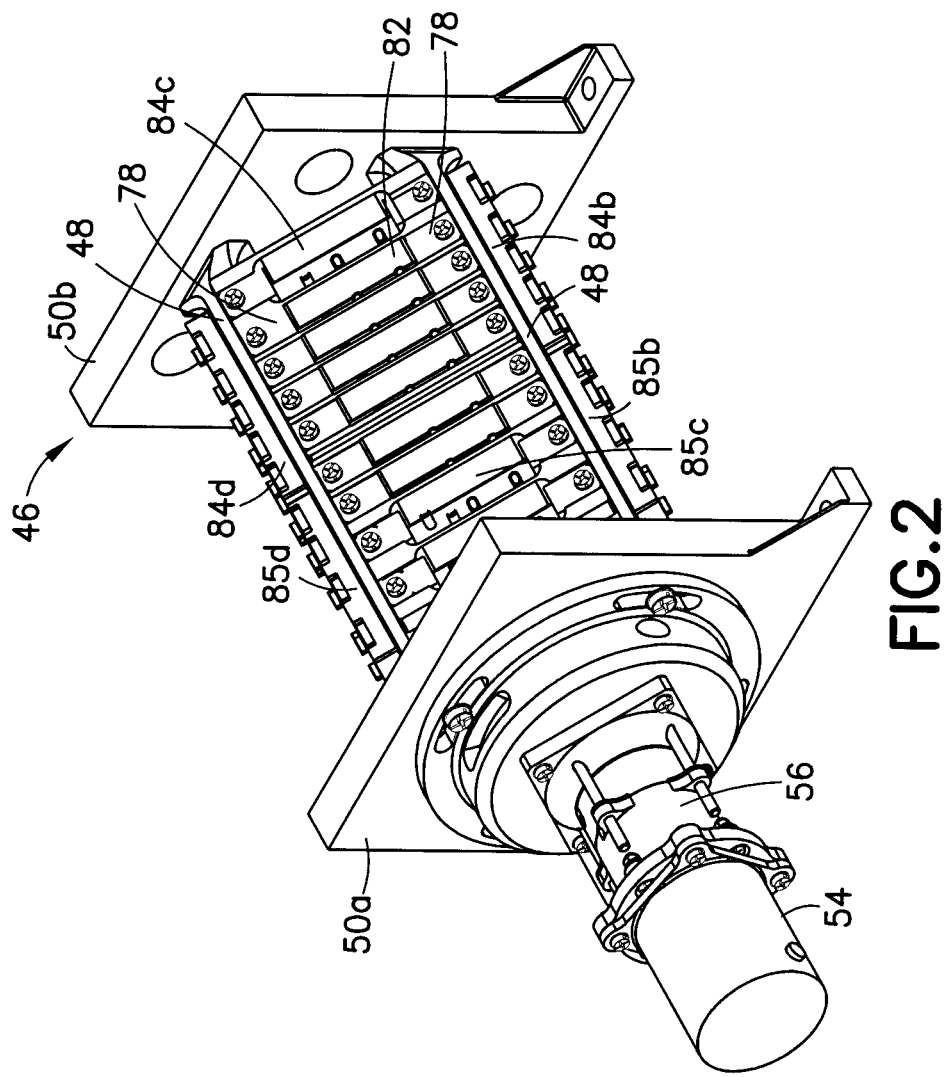
FIG. 2 is a diagram showing an isometric view of an RSA unit in accordance with one embodiment. Some components of the RSA unit have been omitted for clarity.
Figure 3:
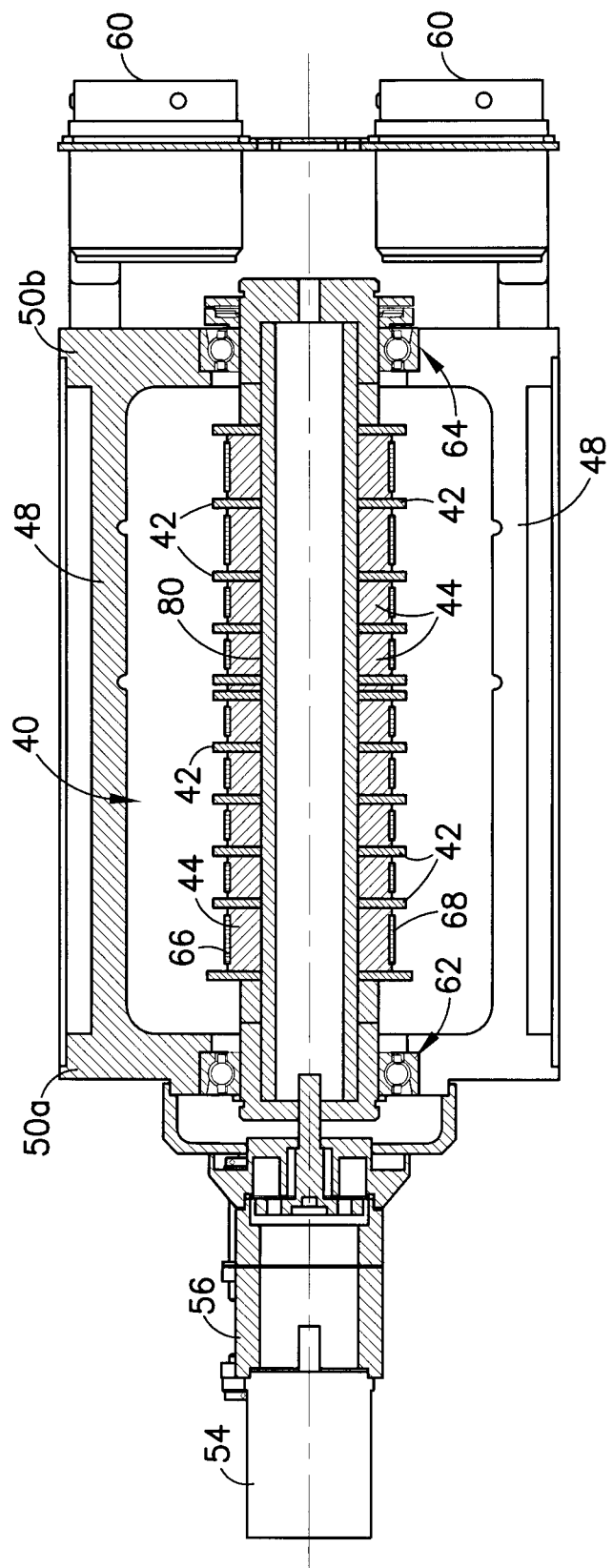
FIG. 3 is a diagram showing a sectional view of a shaft assembly and other components of a RSA unit in accordance with one embodiment. (A stepper motor 54 is not shown in section.)

All of the above-described electrical connections 15 between XPC 10 and thruster 12 are made and broken by rotation of the shaft assembly of RSA 14 (see FIG. 1). FIGS. 2 and 3 show some components of a single RSA in accordance with one embodiment (some components have been omitted for clarity). The RSA 14 shown in FIG. 2 comprises a housing 46 consisting of a pair of mounting plates 50a, 50b connected by four rails 48. Two sets of brush blocks (four brush blocks in each set) are fastened to rails 48 to form two square enclosures which are disposed adjacent to each other between the mounting plates. Only brush blocks 84b, 84c and 84d of the first set of brush blocks and brush blocks 85b, 85c and 85d of the second set of brush blocks are visible in FIG. 2. These square enclosures surround the shaft assembly (not visible in FIG. 2). Each brush block of the first set is configured to support a row of five brushes, while each brush block of the second set is configured to support a row of four brushes. Together the eight brush blocks support four rows of brushes, each row consisting of nine brushes in contact with respective contact rings. The brush blocks may be made of a polyetherimide resin, such as Ultem polyetherimide resin.

Each brush block has contact plates 82 attached thereto by clamps 78, as seen in FIG. 2. The number of contact plates 82 attached to any brush block is equal to the number of brushes supported in a row by that brush block (i.e., either four or five in this embodiment). The total number of contact plates for the embodiment depicted in FIG. 2 is 36.

Figure 8:
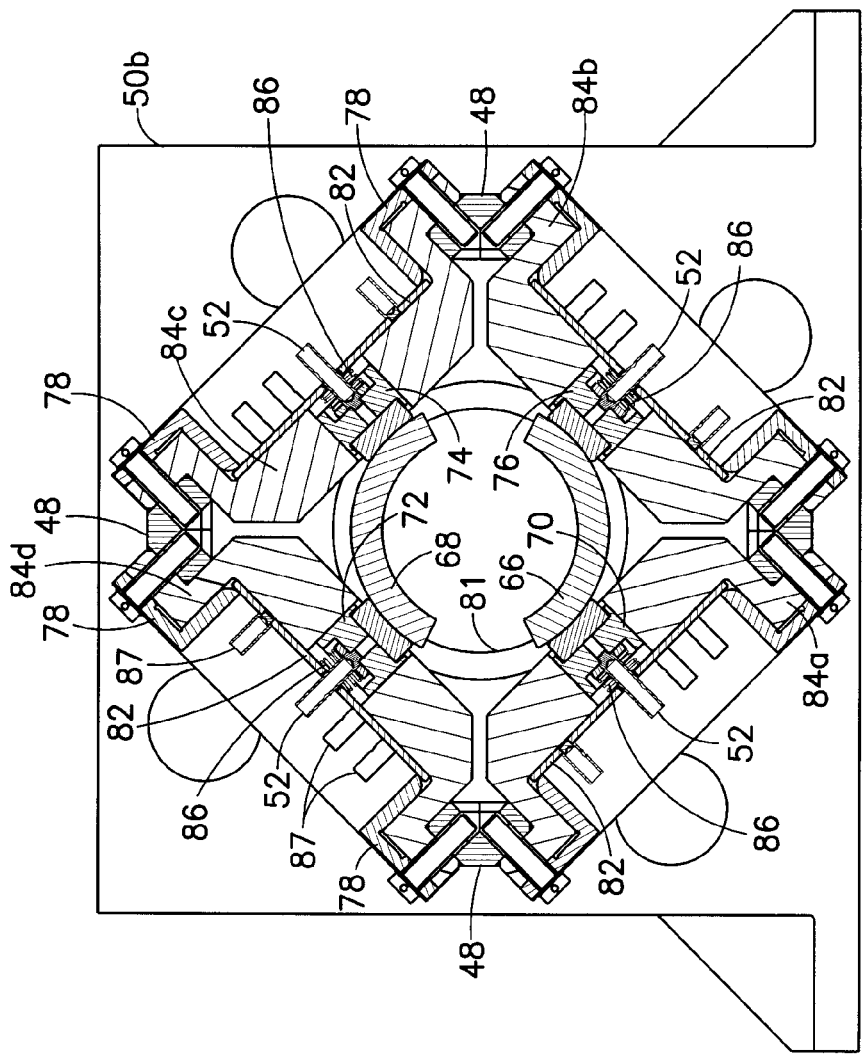
FIG. 8 is a diagram showing a sectional view of a rotary switch assembly having four brushes per ring and having a shaft assembly different than that shown in FIG. 3.

FIG. 8 is a sectional view showing four contact plates 82 clamped to four brush blocks 84a-84d by respective pairs of clamps 78. Other contact plates in front of or behind contact plates 82 are not shown in FIG. 8. Each contact plate 82 is a plate made of conductive metal (e.g., silver-plated copper) with solder posts (see items 87 in FIG. 8) brazed to it. The contact plate 82 provides a common electrical junction for several power wires (not shown in FIG. 8) that are then electrically connected to contact posts 52 of brush assemblies 70, 72, 74, 76 (hereinafter "brushes") respectively mounted to brush blocks 84a-84d. The brushes may be made of plated copper or a metal alloy comprising molybdenum, silver, graphite and other constituents.

Referring again to FIG. 3, a shaft assembly 40 is rotatably supported by mounting plates 50a, 50b via respective ball bearing assemblies 62 and 64. Rotation of shaft assembly 40 is driven by stepper motor 54 by means of gearhead 56, which is rotatably mounted to mounting plate 50a. The other mounting plate 50b supports four high-voltage connectors 60 (only two of which are visible in FIG. 3) which carry high-voltage electrical power provided by the power supply system. Each of the four connectors 60 is electrically connected to a respective set of brushes (not shown in FIGS. 2 and 3). As previously explained, the first of the four connectors is connected to a first XPC; the second connector is connected to a first thruster; the third connector is connected to a second XPC; and the fourth connector is connected to a second thruster.

Still referring to FIG. 3, in accordance with one embodiment the shaft assembly 40 comprises a plurality of contact rings 44, each contact ring having two electrically conductive arc-shaped segments 66 and 68, and substantially non-conductive separator disks 42. The separator disks 42 prevent unwanted electrical interference from adjacent contact rings 44. Additional isolation elements may be placed between the separator disks to further isolate adjacent rings, and to prevent debris from moving from one contact ring to another.

The contact rings 44 may be made of a cast epoxy. The electrically conductive segments 66, 68 may be made of silver or plated copper.

Electrical connections between an XPC and a thruster are made by rotating the shaft assembly until conductive brushes come into contact with the electrically conductive contact segments 66, 68 mounted on the exterior surface of the contact rings. In accordance with the embodiment depicted in FIG. 3, there are a total of nine contact rings. The shaft assembly 40 comprises a center shaft 80 on which separator disks 42 and contact rings 44 are mounted. The angular position of center shaft 80 relative to housing 46 determines the mode of RSA 14.

FIGS. 4-7 are diagrams showing some (but not all) modes of a pair of RSAs (RSA A and RSA B) which are arranged to allow various thrusters to be connected to two XPCs for extra redundancy. In each of FIGS. 4-7, the following connections are fixed: connector J1 of XPC1 is connected to connector J11 of RSA A; connector J2 of XPC1 is connected to connector J11 of RSA B; connector J1 of XPC2 is connected to connector J22 of RSA A; connector J2 of XPC2 is connected to connector J22 of RSA B; connector J1 of RSA A is connected to Thruster 1; connector J2 of RSA A is connected to Thruster 2; connector J1 of RSA B is connected to Thruster 3; and connector J2 of RSA B is connected to Thruster 4.

Figure 4:
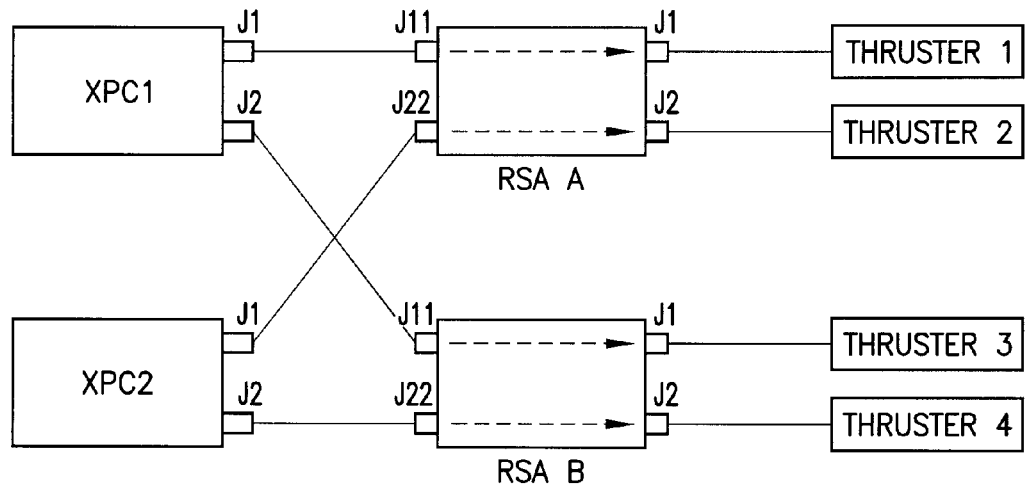
FIGS. 4-7 are diagrams showing some (but not all) modes of a pair of RSAs of the type depicted in FIGS. 1-3, including a normal mode (FIG. 4), a cross strapped mode (FIG. 5), an isolation normal mode (FIG. 6) and an isolation cross strapped mode (FIG. 7).

FIG. 4 shows a normal mode wherein the shaft assemblies of the RSAs are rotated to angular positions which cause input connectors J11 and J22 of each RSA to be connected to output connectors J1 and J2 respectively, as a result of which Thrusters 1 and 3 can receive power from XPC1 and Thrusters 2 and 4 can receive power from XPC2.

Figure 5:
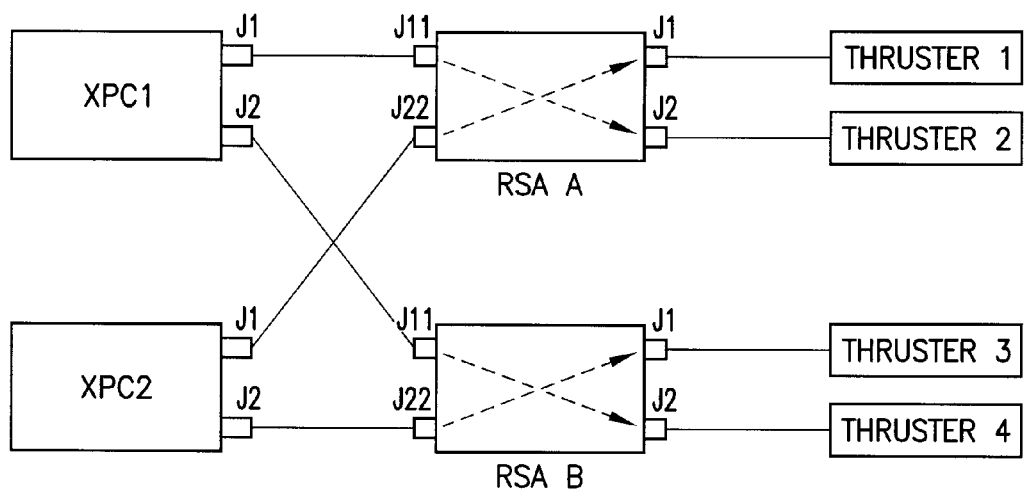

FIG. 5 shows a cross strapped mode wherein the shaft assemblies of the RSAs are rotated to angular positions which cause input connectors J11 and J22 of each RSA to be connected to output connectors J2 and J1 respectively, as a result of which Thrusters 1 and 3 can receive power from XPC2 and Thrusters 2 and 4 can receive power from XPC1.

In addition, it is possible that one RSA is in the normal configuration and the other is in the cross strapped configuration.

Figure 6:
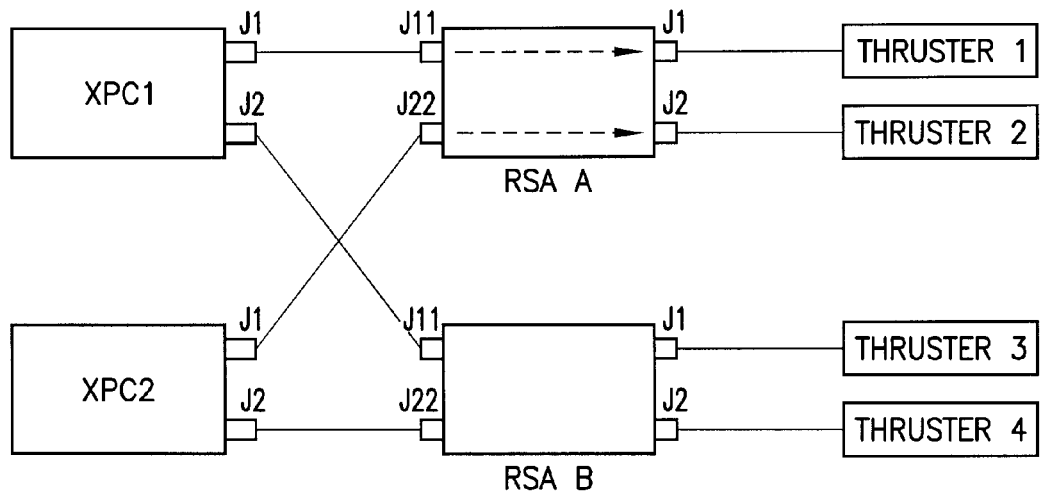

FIG. 6 shows an isolation normal mode wherein the shaft assembly of RSA A is rotated to an angular position which causes input connectors J11 and J22 of RSA A to be connected to output connectors J1 and J2 respectively, while the shaft assembly of RSA B is rotated to an angular position which causes input connectors J11 and J22 of RSA to be not connected to output connectors J1 and J2. In this isolation mode, Thrusters 3 and 4 are isolated from the XPCs. By reversing the modes of the RSAs shown in FIG. 6, the XPCs can be connected to Thrusters 3 and 4 and isolated from Thrusters 1 and 2.

Figure 7:
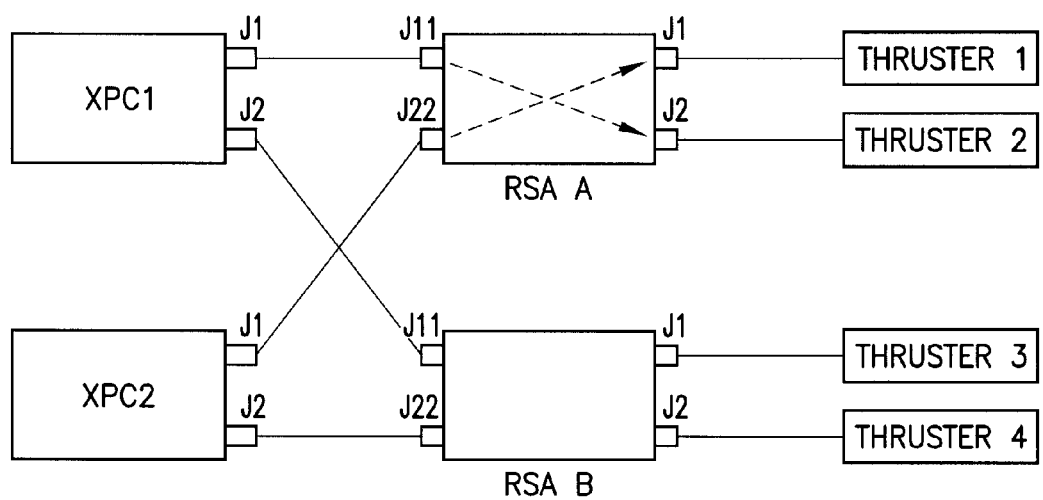

FIG. 7 shows an isolation cross strapped mode wherein the shaft assembly of RSA A is rotated to an angular position which causes input connectors J11 and J22 of RSA A to be connected to output connectors J2 and J1 respectively, while the shaft assembly of RSA B is rotated to an angular position which causes input connectors J11 and J22 of RSA to be not connected to output connectors J1 and J2. In this isolation mode, Thrusters 3 and 4 are isolated from the XPCs. By reversing the modes of the RSAs shown in FIG. 7, the XPCs can be connected to Thrusters 3 and 4 and isolated from Thrusters 1 and 2.

FIG. 8 shows a sectional view of a rotary switch assembly having four brushes (items 70, 72, 74, 76) per ring and having a shaft assembly 81 different than that shown in FIG. 3. In FIG. 3, the non-conductive separator disks 42 and the shaft 80 are separate components. In FIG. 8, these components have been integrated to form a shaft 81 having two diametrally opposed arc-shaped grooves in which a pair of circumferentially disposed, arc-shaped contact segments 66 and 68 made of electrically conductive material are seated. These conductive contact segments are separated by respective substantially non-conductive segments of the exterior surface of shaft 81.

As seen in FIG. 8, each brush block 84a-84d is attached to longitudinal rails 48 of housing 46 to form a generally square brush support housing. Each brush block 84a-84d supports a respective row of five brush assemblies. As shown in FIG. 8, there are four brushes 70, 72, 74, 76, for each pair of contact segments 66 and 68. These brushes slidably contact the exterior surface of shaft assembly 81 as the latter is rotated, thereby selectively providing electrical contact with the contact segments 66, 68.

Still referring now to FIG. 8, each brush assembly comprises a respective brush 70, 72, 74, 76 made of electrically conductive material, a respective contact post 52 (also made of electrically conductive material) which extends through a respective opening in a respective brush block 84a-84d, and a brush preload spring 86 arranged between a flange of the contact post 52 and the associated contact plate 82 to urge the respective brushes into contact with the conductive segments 66 and 68. Four brush blocks 84a-84b are fastened to four rails 48 to form a square enclosure, as previously described. The brushes 70, 72, 74, 76 are displaceable along respective radial axes which are separated from each other by 90 degrees.

Figure 8C:
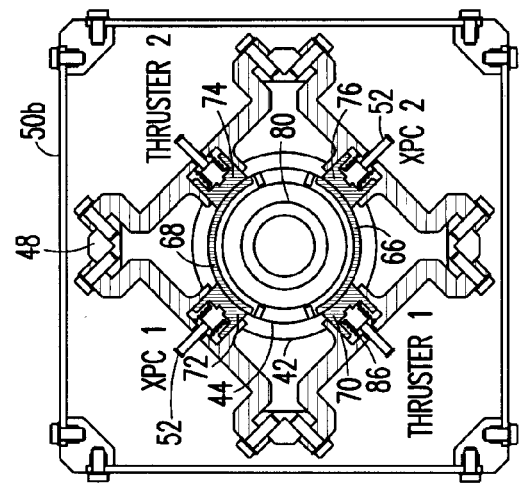
FIGS. 8A, 8B and 8C are diagrams showing a sectional view of a rotary switch assembly in a normal configuration (FIG. 8A), in an open configuration (FIG. 8B) and in a cross strapped configuration (FIG. 8C). This rotary switch assembly has four brushes per ring and a shaft assembly the same as that shown in FIG. 3.
Figure 8B:
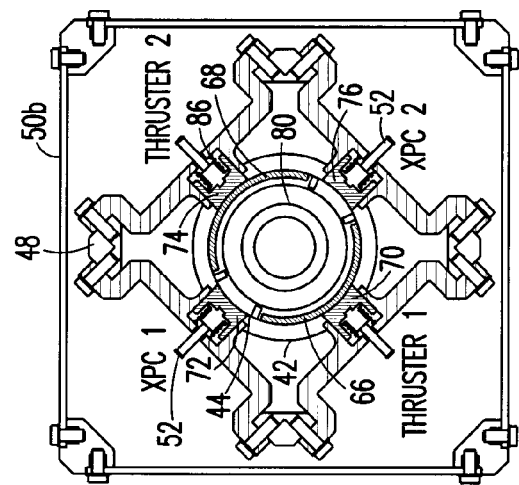
Figure 8A:
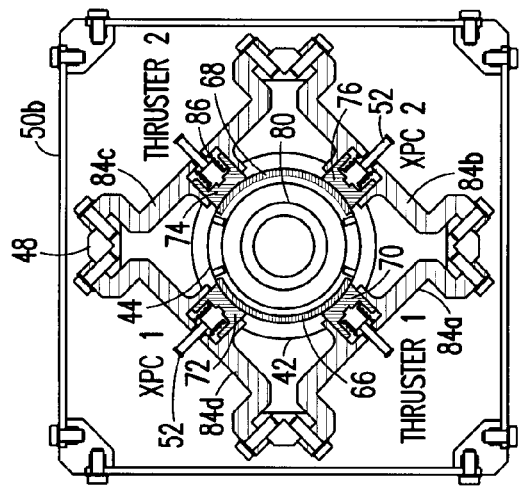

FIGS. 8A, 8B and 8C are diagrams showing a sectional view of a rotary switch assembly having four brushes 70, 72, 74, 76 per ring and a shaft assembly 40 which is the same as that shown in FIG. 3. The rotary switch assembly is shown in a normal configuration (FIG. 8A), in an open configuration (FIG. 8B) and in a cross strapped configuration (FIG. 8C).

In the embodiment depicted in FIGS. 8A-8C, selective connection of one XPC to one thruster of a pair and the other XPC to another thruster of the same pair is achieved by rotating the center shaft 80 to an angular position whereat one pair of adjacent brushes is in contact with contact segment 66 and the other pair of adjacent brushes is in contact with contact segment 68. In effect, each contact segment forms a bridge between a pair of conducting brushes in either of two angular positions. When the center shaft is rotated in either direction by an angle of 45°, opposing brushes come into contact with the non-conductive segments located between contact segments 66 and 68, thereby opening the "switches" formed by pairs of adjacent brushes bridged by a respective contact segment. In this manner, the angular position of shaft assembly 40 relative to housing 46 determines the mode of RSA 14.

FIG. 8A shows the RSA in a normal configuration wherein Thruster 1 is connected to XPC1 and Thruster 2 is connected to XPC2. In this configuration, the center shaft 80 is at an angular position of 0°, at which angular position brushes 70 and 72 are in contact with contact segment 66 and brushes 74 and 76 are in contact with contact segment 68.

FIG. 8B shows the RSA in an open state wherein neither Thruster 1 nor Thruster 2 is connected to XPC1 or XPC2. In this state, the center shaft 80 is at an angular position of 45°, at which angular position brush 70 is in contact with contact segment 66, brush 72 is in contact with one non-conductive segment of contact ring 44, brush 74 is in contact with contact segment 68, and brush 76 is in contact with the other non-conductive segment of contact ring 44.

FIG. 8C shows the RSA in a cross configuration wherein Thruster 1 is connected to XPC2 and Thruster 2 is connected to XPC1. In this configuration, the center shaft 80 is at an angular position of 90°, at which angular position brushes 70 and 76 are in contact with contact segment 66 and brushes 72 and 74 are in contact with contact segment 68.

Figure 9A:
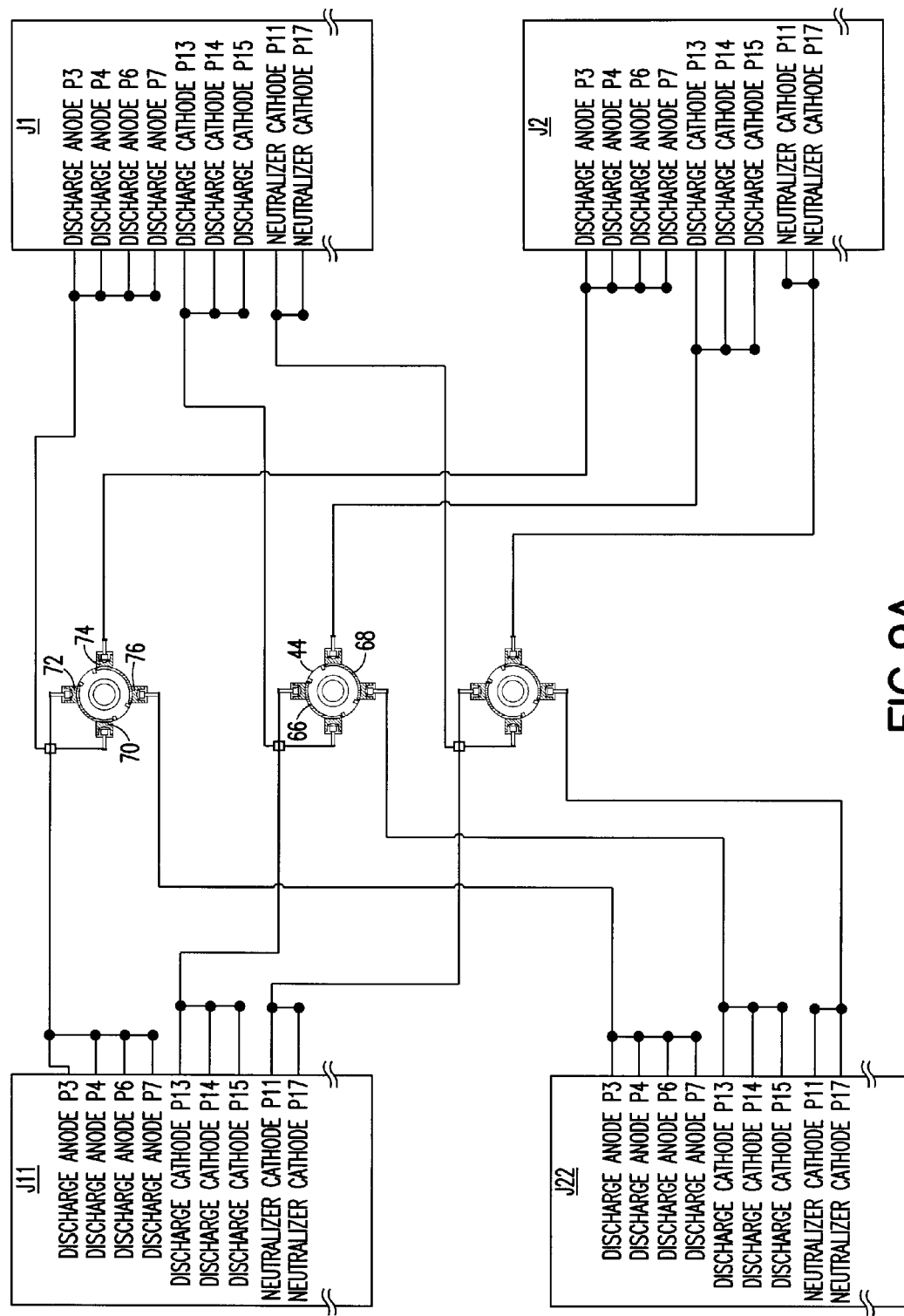
FIGS. 9A and 9B are schematics showing one set of nine power connections for the rotary switch assembly and normal configuration partly depicted in FIG. 8A.
Figure 9B:
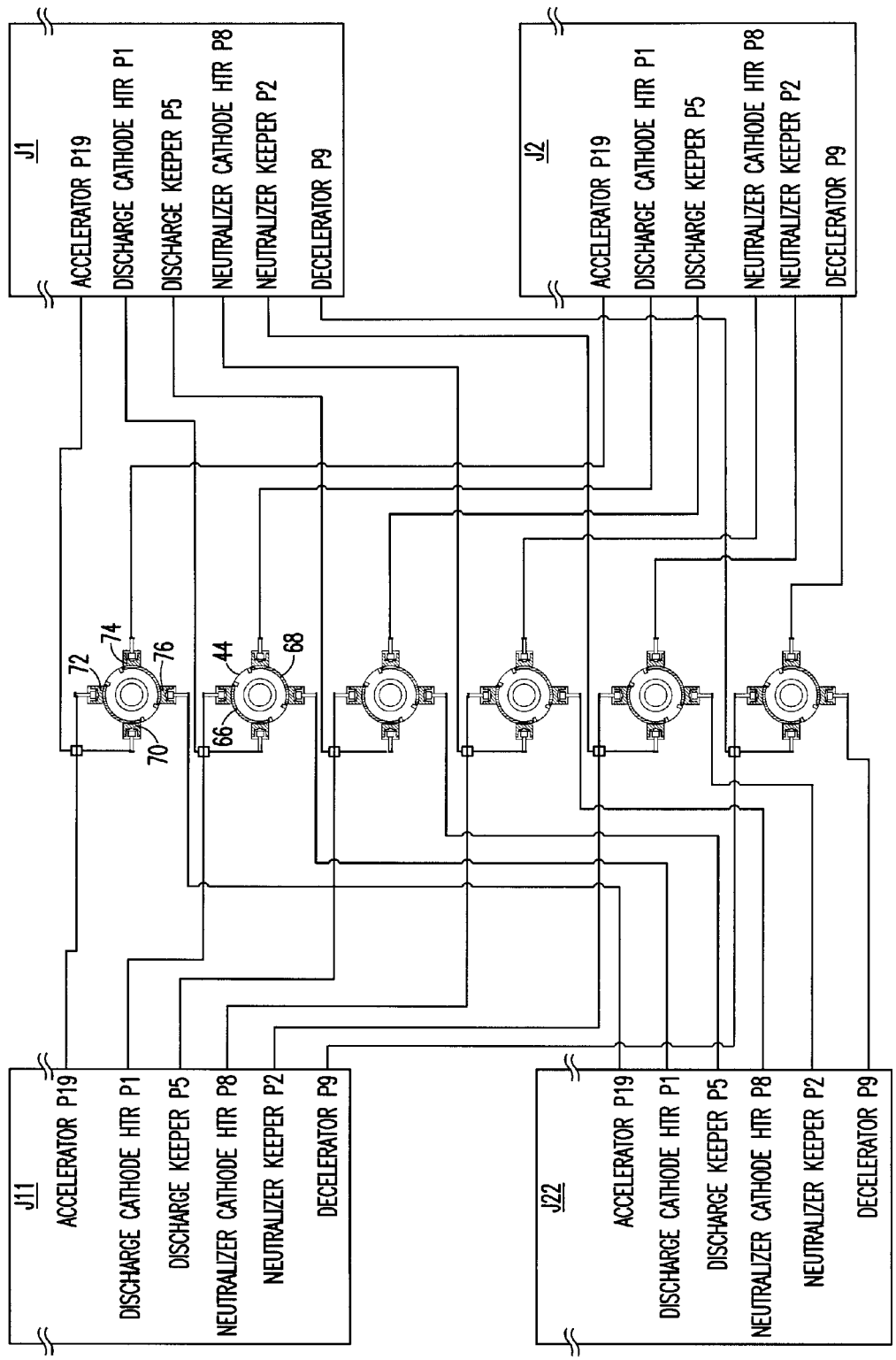

FIGS. 9A and 9B show one set of nine power connections for a rotary switch assembly in the normal configuration as partly depicted in FIG. 8A. Whereas FIG. 8A showed the state of one contact ring, FIGS. 9A and 9B show the states of nine contact rings of a rotary switch assembly having four brushes per contact ring. Although these nine contact rings are depicted in different locations in the diagram for the purpose of illustration, it should be understood that these nine contact rings are coaxial and mounted on a common center shaft. In the normal configuration depicted in FIGS. 9A and 9B, connector J11 is electrically coupled to connector J1, while connector J22 is electrically coupled to connector J2.

Figure 10:
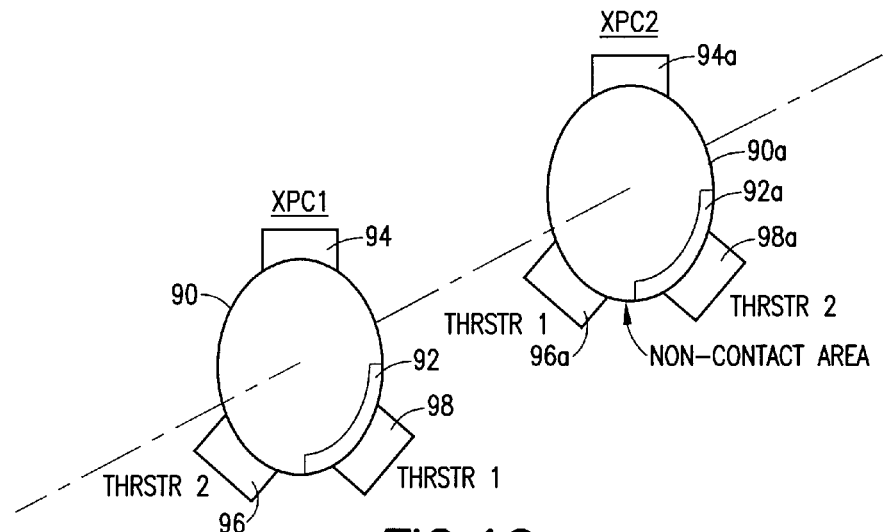
FIGS. 10 and 11 are diagrams showing schematic isometric views of a rotary switch assembly having two coaxial sets of contact rings (e.g., nine contact rings in each set), with three brushes per contact ring.
Figure 11:
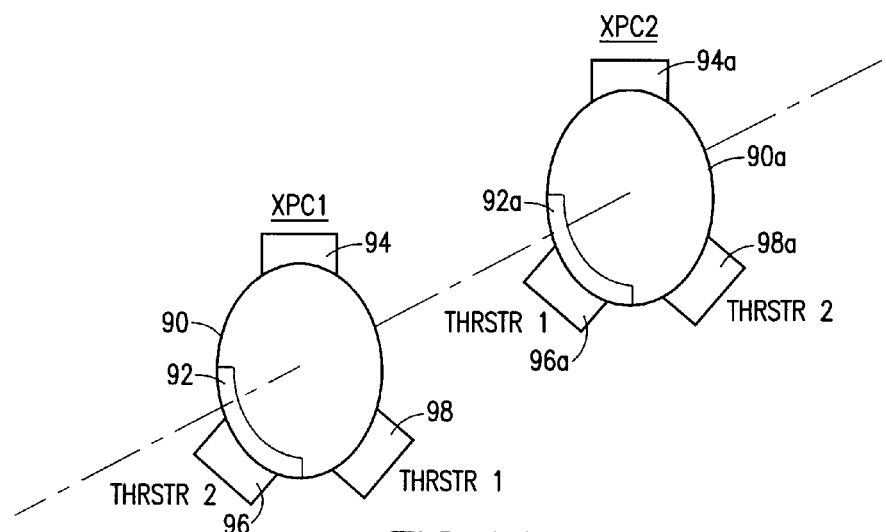

FIGS. 10 and 11 are diagrams showing schematic isometric views of a rotary switch assembly having two coaxial sets of contact rings (e.g., nine contact rings in each set), with three brushes per contact ring. The dashed line indicates the axis of the common center shaft. FIG. 10 shows the rotary switch assembly in a cross strapped configuration; FIG. 11 shows the rotary switch assembly in a normal configuration. One circular contact ring of each rotary switch assembly is depicted by a respective oval in FIGS. 10 and 11. However, it should be understood that each rotary switch assembly is implemented by assembling an alternating series of contact rings and separator disks (e.g., 18 contact rings) on a center shaft (not shown in FIGS. 10 and 11). In this embodiment, each contact ring (e.g., 90 and 90a) has a non-conductive segment (e.g., 92 and 92a) on its exterior surface. The remainder of the exterior surface is conducting. For example, each contact ring may comprise solid conductive metal with an outer arc-shaped segment that contains insulating material. When a brush runs over an insulator, that brush is electrically isolated from the contact ring and other brushes in contact with that contact ring. In operation, only one thruster and one XPC will be connected at any instant in time. The RSA is only switched to a different configuration when the ion propulsion system is off.

In the embodiment depicted in FIGS. 10 and 11, the RSA has 18 contact rings which are rotatable in unison. Nine of the contact rings connect XPC1 to either Thruster 1 or Thruster 2, and conversely the other nine contact rings connect XPC2 to either Thruster 2 or Thruster 1. In this embodiment, each of the 18 contact rings has three brushes (e.g., 94, 96, 98 and 94a, 96a, 98a) associated therewith, which brushes are spring-loaded (the springs are not shown) and displaceable along respective radial axes which are separated by angles of 120° (compare this to the embodiment depicted in FIG. 8, wherein the angle between brushes is 90°). A second RSA (not shown in FIGS. 10 and 11) can be arranged to selectively connect the XPCs to third and fourth thrusters (not shown in FIGS. 10 and 11).

FIG. 10 shows the first RSA in a cross strapped configuration wherein Thruster 2 is connected to XPC1 and Thruster 1 is connected to XPC2. In this configuration, the center shaft (not shown) is at an angular position of 0°. At an angular position of 0°, brushes 94 and 96 are in contact with the conducting portion of the exterior surface of contact ring 90, while brush 98 is in contact with the non-conductive segment 92 of contact ring 90; and brushes 94a and 96a are in contact with the conducting portion of the exterior surface of contact ring 90a, while brush 98a is in contact with the non-conductive segment 92a of contact ring 90a.

FIG. 11 shows the first RSA in a normal configuration wherein Thruster 1 is connected to XPC1 and Thruster 2 is connected to XPC2. In this configuration, the center shaft (not shown) is at an angular position of 120°. At an angular position of 120°, brushes 94 and 98 are in contact with the conducting portion of the exterior surface of contact ring 90, while brush 96 is in contact with the non-conductive segment 92 of contact ring 90; and brushes 94a and 98a are in contact with the conducting portion of the exterior surface of contact ring 90a, while brush 96a is in contact with the non-conductive segment 92a of contact ring 90a.

The embodiment with three brushes per contact ring also enables the electrical isolation of Thrusters 1 and 2 when brushes 94 and 94a are respectively in contact with the non-conductive segment 92 and 92a.

Figure 12A:
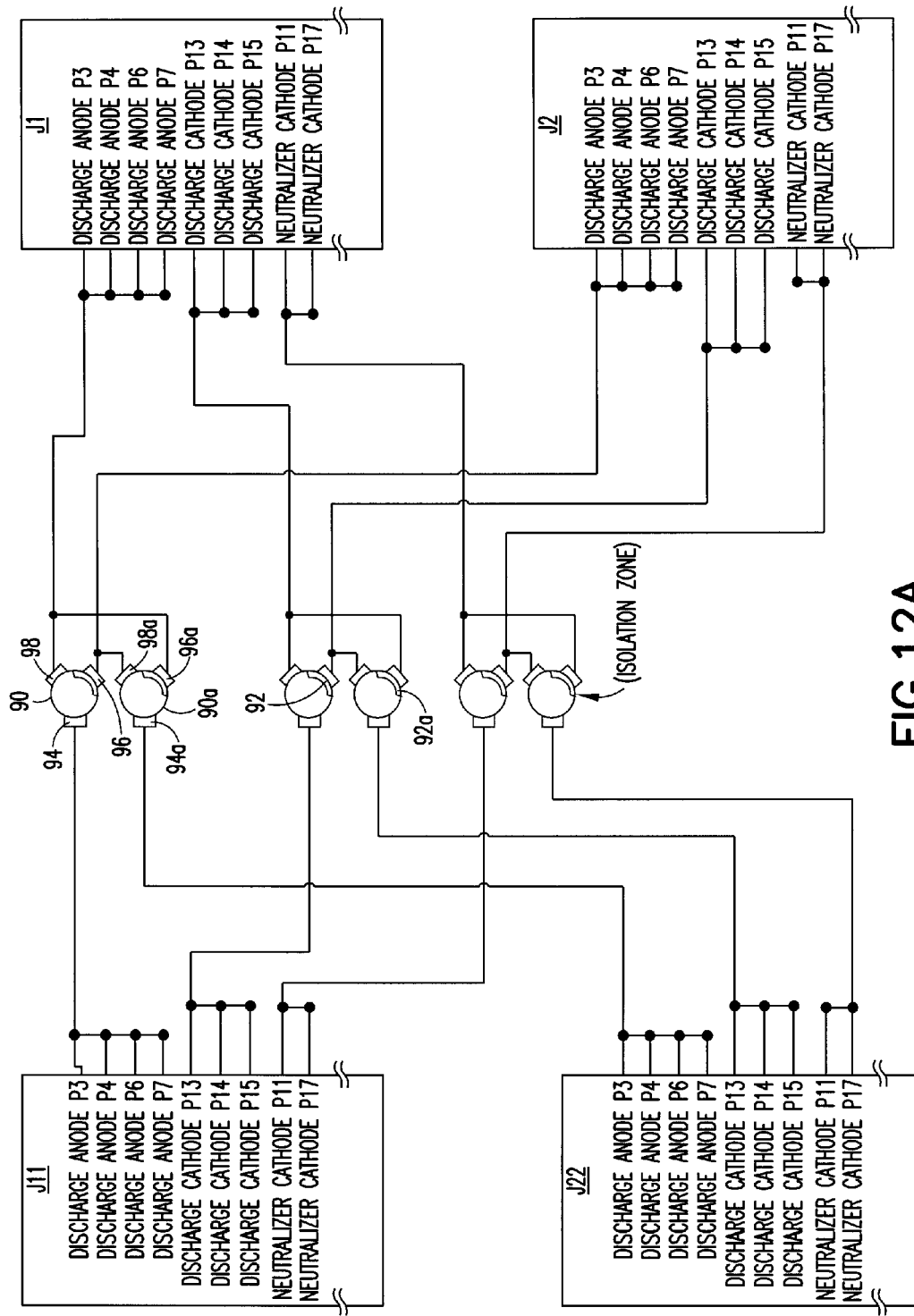
FIGS. 12A and 12B are schematics showing all power connection in each a rotary switch assembly in accordance with the embodiment partly depicted in FIGS. 10 and 11.
Figure 12B:
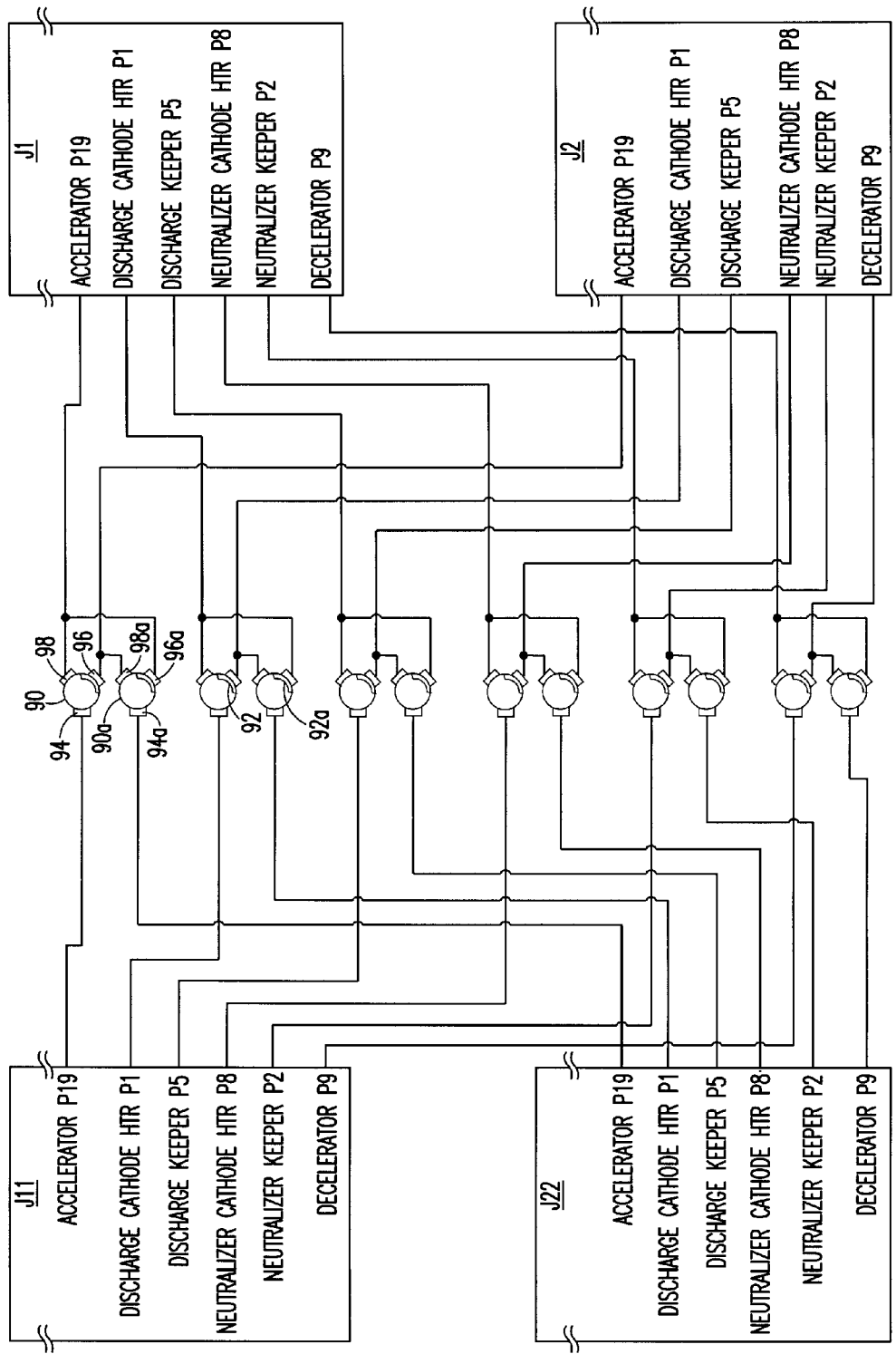

FIGS. 12A and 12B show one set of 18 power connections for a rotary switch assembly in the normal configuration as partly depicted in FIG. 10. Whereas FIG. 10 showed the state of two contact rings, FIGS. 12A and 12B show the states of 18 contact rings of a rotary switch assembly having three brushes per contact ring. Although these 18 contact rings are depicted in different locations in the diagram for the purpose of illustration, it should be understood that these 18 contact rings are coaxial and mounted on a common center shaft. In the normal configuration depicted in FIGS. 12A and 12B, connector J11 is electrically coupled to connector J1, while connector J22 is electrically coupled to connector J2.

FIG. 13 shows basic components of an XIPS in accordance with the embodiments disclosed above. The depicted components include only one of two XPCs 10, one of two RSAs 14, one of four thrusters 12 and one of two stepper motors 54. Each stepper motor 54 is controlled by a central computer 36 (e.g., onboard the satellite). With respect to the components shown in FIG. 13, the central computer 36 sends out a pulse train that steps the stepper motor 54. The pulse train is the only input to the stepper motor 54 and provides the signal to step and also the power needed to perform the stepping function. In other words, the stepper motors do not require a separate power supply; just the one control line from the central computer 36.

Still referring to FIG. 13, the power supplies that power up the thruster 12 are provided by the XPC 10. The 4.5 kilowatts of power sent to thruster 12 from the XPC 10 is switched by the RSA 14. The power supplies from XPC 10 are turned on and off by the central computer 36, but the fine adjustments of the output power, for the purpose of keeping the thruster's operation stable, are done internally in the XPC 10; the central computer 36 merely commands the XPC 10 to start and stop the thruster power.

The systems described above each provide thruster connectivity such that either XPC can fire any one of the four thrusters. In accordance with some embodiments, connectivity is provided through a segmented slip ring. Using proven brush and slip ring technology, the segmented slip rings and brush orientation allow only one thruster and one XPC to be connected at all times, i.e., two thrusters cannot be connected to one XPC and two XPCs cannot be connected together. These arrangements allow either pair of thrusters to be isolated. When in isolation mode, the thruster will not be connected to an XPC and, hence, will not be grounded through the XPC. However, for this isolation case, resistors (e.g., 20 mega-ohm) to ground are added for each circuit in the RSA, on the thruster side of the switch, so that the thruster(s) will remain grounded in the isolation configuration, thereby avoiding electrostatic discharge or grounding issues.

Further, the disclosed systems use a single rotating element in an RSA for very reliable operation. Alternatively a single displaceable element could be used in different switch configurations. In other words, other types of switches that switch in unison can be used to switch the individual circuits that connect power controllers to ion propulsion thrusters. Such alternative switching systems may comprise leaf-spring type contacts that are opened/closed by means of rotary contact arms or linearly movable contact plates, wherein pairs of springs are contacted to form a multi-pole switch. Other leaf spring design concepts include rotary rocker arms and linear jackscrews. The provision of a switch assembly having a single common switching element (e.g., a center shaft that rotates) allows either of two XPCs to fire either of two thrusters, depending on the angular position (first or second angular position) of that center shaft. In a third angular position of the center shaft, the same two thrusters can be electrically isolated from the two XPCs.

The ion propulsion system is preferably designed to allow switching of voltages up to 2000 volts and associated currents up to 25 amperes. A properly designed system is small and compact, easy to assemble, and has low recurring cost.

While ion propulsion systems have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

As used in the claims, the term "computer system" should be construed broadly to encompass a system having at least one computer or processor, and which may have two or more autonomous computers or processors that communicate through a network or bus.

The invention claimed is:

1. An ion propulsion system comprising first and second power controllers, first and second ion thrusters and a first switch assembly having at least respective first and second switching states, wherein when said first and second power controllers are on, said first and second ion thrusters receive power from said first and second power controllers respectively via said first switch assembly when said first switch assembly is in said respective first switching state and receive power from said second and first power controllers respectively via said first switch assembly when said first switch assembly is in said respective second switching state, and wherein said first switch assembly comprises a first body which is movable and a first multiplicity of switches which change state in unison when said first body changes position, said first switch assembly being in said respective first switching state when said first body is in a respective first position and being in said second switching state when said first body is in a respective second position.

2. The system as recited in claim 1, wherein said first body comprises a center shaft that is rotatable and said respective first and second positions are first and second angular positions respectively of said center shaft.

3. The system as recited in claim 2, further comprising a stepper motor operatively coupled to said center shaft for changing an angular position of said center shaft.

4. The system as recited in claim 3, further comprising a computer system which is programmed to send a pulse train that steps the stepper motor and provide power needed by the stepper motor to perform a stepping function.

5. The system as recited in claim 4, wherein said computer system is further programmed to selectively turn power supplies provided by said first or second power controller on and off for keeping operation of said first or second ion thruster stable.

6. The system as recited in claim 2, wherein said first switch assembly further comprises a plurality of contact disks attached to said center shaft and a multiplicity of brushes, a respective set of three brushes being in contact with a respective exterior surface of each contact disk, each exterior surface comprising a conductive contact segment and a non-conductive segment.

7. The system as recited in claim 2, wherein said first switch assembly further comprises a plurality of contact disks attached to said center shaft and a multiplicity of brushes, a respective set of four brushes being in contact with a respective exterior surface of each contact disk, each exterior surface comprising a pair of conductive contact segments and a pair of non-conductive segments.

8. The system as recited in claim 1, wherein said first and second ion thrusters are electrically isolated from said first and second power controllers by said first switch assembly when said first body is in a respective third position.

9. The system as recited in claim 8, wherein said first body comprises a center shaft that is rotatable and said respective first, second and third positions are first, second and third angular positions respectively of said center shaft.

10. The system as recited in claim 1, further comprising third and fourth ion thrusters and a second switch assembly having at least respective first and second switching states, wherein when said first and second power controllers are on, said third and fourth ion thrusters receive power from said first and second power controllers respectively via said second switch assembly when said second switch assembly is in said respective first switching state and receive power from said second and first power controllers respectively via said second switch assembly when said second switch assembly is in said respective second switching state, and wherein said second switch assembly comprises a second body which is movable and a second multiplicity of switches which change state in unison when said second body changes position, said second switch assembly being in said respective first switching state when said second body is in a respective first position and being in said second switching state when said second body is in a respective second position.

11. The system as recited in claim 1, wherein each of said first and second power controllers comprises a respective supply bus and a respective Zener diode connected to said respective supply bus to allows said respective supply bus to float negative with respect to a spacecraft potential to realize a potential which causes an electron stream to equalize an ion beam.

12. The system as recited in claim 1, wherein each of said first and second thrusters comprises a respective discharge anode and a respective discharge cathode, and each of said first and second power controllers comprises a respective supply bus that references a discharge power supply, a discharge keeper power supply, a discharge heater power supply and a screen grid to a discharge electron source, said discharge power supply being coupled to a respective discharge anode to provide ionizing power to a fuel and a screen power supply being coupled to a respective discharge cathode to drive a main beam.

13. An ion propulsion system comprising first and second power controllers, first through fourth ion thrusters, and first and second switch assemblies, said first switch assembly being connected to said first and second power controllers and to said first and second ion thrusters, and said second switch assembly being connected to said first and second power controllers and to said third and fourth ion thrusters, wherein each of said first and second switch assemblies has respective first and second switching states which can be selected to enable either of said first and second power controllers to supply power to any one of said first through fourth ion thrusters, said first switch assembly comprises a first body which is movable and a first multiplicity of switches which change state in unison when said first body changes position, and said second switch assembly comprises a second body which is movable and a second multiplicity of switches which change state in unison when said second body changes position.

14. The system as recited in claim 13, wherein said first body comprises a first center shaft that is rotatable and said second body comprises a second center shaft that is rotatable.

15. The system as recited in claim 14, further comprising: a first stepper motor operatively coupled to said first center shaft for changing an angular position of said first center shaft; and a second stepper motor operatively coupled to said second center shaft for changing an angular position of said second center shaft.

16. The system as recited in claim 15, further comprising a computer system which is programmed to selectively send a pulse train that steps said first or second stepper motor and provide power needed by said first or second stepper motor to perform a stepping function.

17. The system as recited in claim 16, wherein said computer system is further programmed to selectively turn power supplies provided by said first or second power controller on and off for keeping operation of said first, second, third or fourth ion thruster stable.

18. The system as recited in claim 14, wherein said first switch assembly further comprises a first plurality of contact disks attached to said brushes being in contact with a respective exterior surface of each contact segment and at least one non-conductive segment.

19. A method for providing power from a selected one of first and second power controllers to a selected one first and second ion thrusters onboard a satellite, comprising:
(a) connecting the first and second ion thrusters and the first and second power controllers to a switch assembly that comprises a body which is movable and a multiplicity of switches which change state in unison when the body changes position from a first position whereat said selected one of the first and second ion thrusters is not connected to said selected one of the first and second power controllers to a second position whereat said selected one of the first and second ion thrusters is connected to said selected one of the first and second power controllers by way of the switches;
(b) causing the body to change its position from said first position to said second position; and
(c) turning on said selected one of the first and second power controllers while the body is in said second position.

20. The method as recited in claim 19, wherein the body comprises a center shaft that is rotatable and said first and second positions are first and second angular positions respectively of said center shaft.

21. The method as recited in claim 19, wherein step (b) comprises stepping a stepper motor that is operatively coupled to the body.

22. A method for providing power from a selected power controller to a selected ion thruster onboard a satellite, comprising:
(a) rotating an assembly comprising a plurality of contact disks from a first angular position to a second angular position while said selected power controller is turned off; and
(b) turning on said selected power controller while said assembly is in said second angular position.

* * * * *